US 8,458,599 B2

(12) United States Patent
Chang et al.

(10) Patent No.: US 8,458,599 B2
(45) Date of Patent: Jun. 4, 2013

(54) MULTI-USER INTERACTIVE WEB-BASED SEARCHES

(75) Inventors: Adam Chang, Newport Beach, CA (US); Zur Nehushtan, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 550 days.

(21) Appl. No.: 11/801,203

(22) Filed: May 8, 2007

(65) Prior Publication Data

US 2008/0282169 A1  Nov. 13, 2008

(51) Int. Cl.
*G06F 3/00* (2006.01)

(52) U.S. Cl.
USPC .......................................... 715/751; 715/733

(58) Field of Classification Search
USPC ................................................. 715/733, 751
See application file for complete search history.

(56) References Cited

U.S. PATENT DOCUMENTS

| 2005/0160083 | A1* | 7/2005 | Robinson | 707/3 |
|---|---|---|---|---|
| 2005/0234883 | A1* | 10/2005 | Szeto et al. | 707/3 |
| 2006/0122972 | A1* | 6/2006 | Keohane et al. | 707/3 |
| 2007/0226183 | A1* | 9/2007 | Hart et al. | 707/3 |
| 2009/0192900 | A1* | 7/2009 | Collison et al. | 705/14 |

OTHER PUBLICATIONS

Davis, J. et al., "A Coordinated Browsing System" dated 1997 (11 pages).

* cited by examiner

*Primary Examiner* — Matt M. Kim
*Assistant Examiner* — Andrea Leggett
(74) *Attorney, Agent, or Firm* — Hickman Palermo Truong Becker Bingham Wong LLP

(57) ABSTRACT

A method for multiple users to jointly interact with web-based search results is provided. Selections of the search results by a user are immediately communicated to other users. Viewing options may be customized on a per-user basis for greater individual control over viewing the results. Results may be further acted upon to complete transactions. Individual results are easily referenced in chat windows. Status of query and transactions are communicated to all users.

20 Claims, 14 Drawing Sheets

MULTI-USER INTERACTIVE WEB-BASED SEARCHES

FIELD OF THE INVENTION

The present invention relates to enabling multiple users to jointly and contemporaneously query, view, and use web-based search results.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Users have long been able to conduct web-based searches via an application such as a web browser. Web-based searches can be conducted on a variety of data, such as books in an on-line bookstore, movie listings near a particular zip code, and travel information about the costs and availability of hotels and flights. Typically, a web-based search returns a list of search results upon which a user can take further action. In an example where the user has conducted a search for commercial flights, the list of search results would be a list of flights. Once the user has received the list of flights, he can take further action to manipulate and interact with these flight results. For example, he may wish to filter the list of flights so that only flights that depart before a certain time are shown. He may also wish to select a single flight from a list of flights for booking. The ability to conduct web-based searches and to immediately take action on the search results has vastly increased the convenience for users who wish to retrieve information from the web and complete transactions based on the retrieved information.

Often, two or more users may wish to interact with web-based search results together in order to facilitate sharing, communicating, and making joint decisions regarding the search results. However, the current approach is limited because a user conducting a web-based search must work alone. Currently, there are no tools which allow a user to search, view and take action on search results from a web-based search in a collaborative manner with other users. In the example of searching for and booking a flight, if two users wish to travel together on a mutually convenient flight, one user may conduct a web-based search to look for flights. However, communication with a second user cannot be conducted in the same application used to search for the flights. Instead, the first user must use another means, such as email or telephone, to communicate with the second user.

In another approach, users may communicate with one another over the Internet via multi-user communications applications. In one example of this type of application, two users may type messages to one another in a "chat window" that is shown on the displays of both users. In Yahoo!'s Instant Messenger ("IM") application from Yahoo, Inc. in Sunnyvale, Calif., for example, two users who are both on-line at the same time may initiate a chat session, where a "chat window" is displayed on the users' display screens, allowing the users to type messages to each other. All messages typed in a particular chat session are displayed in the chat window. This approach allows users to easily communicate with each other over the Internet, but is also limited because users are limited to simple text communications. This approach does not allow users to jointly retrieve results from a web-based search engine or to act upon those results.

Based on the foregoing, there is a clear need for an approach that allows two or more users to jointly and concurrently search, view, and act upon web-based search results.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
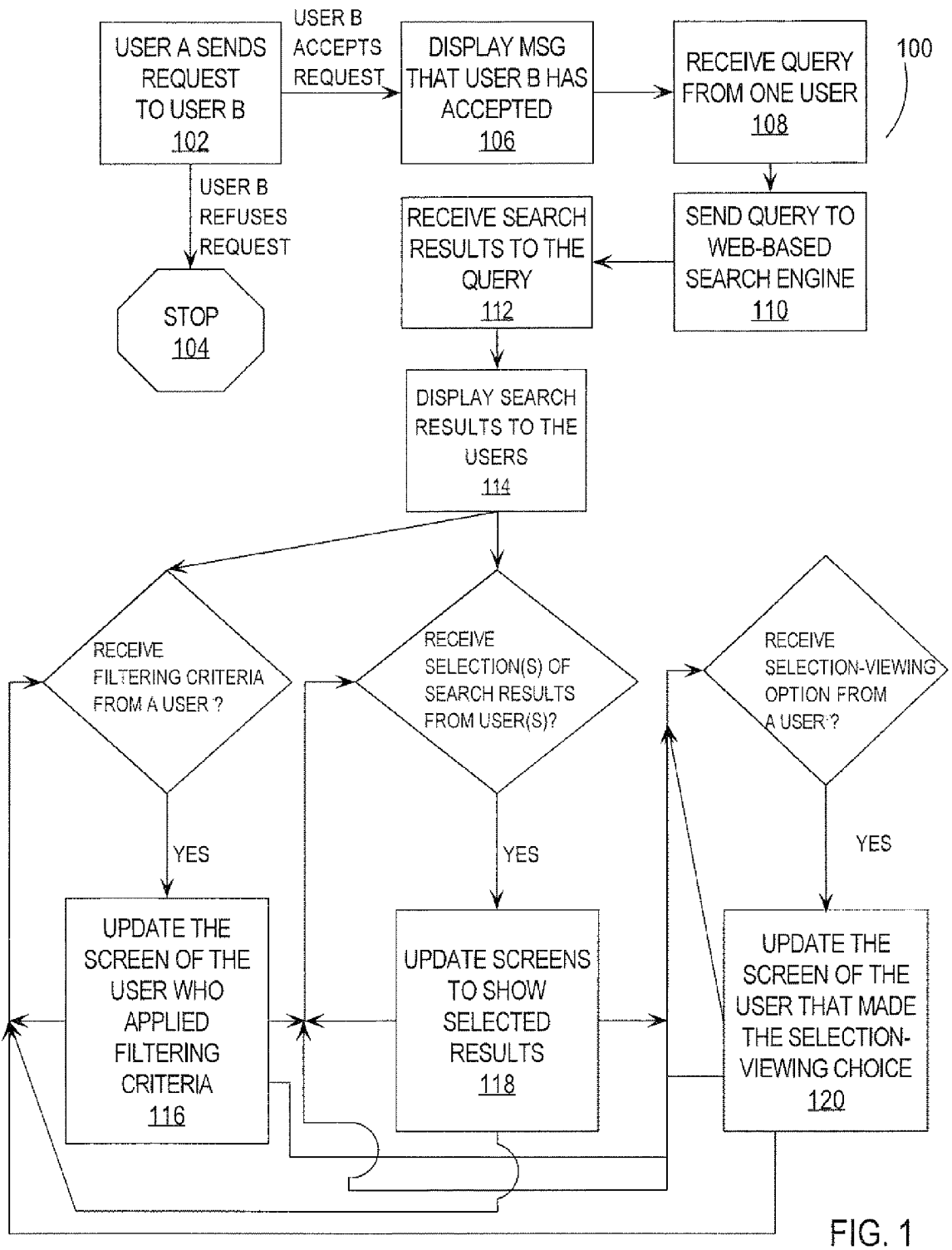
FIG. 1 is a flow diagram illustrating a method for jointly searching, viewing, and using web-based results, according to one embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are discussed herein, which allow users to jointly query, view, and use web-based results. Accordingly, one approach allows a user participating in a joint session with other users to send a query to a web-based search engine. Examples of web-based travel search engines are Kayak from Kayak.com in Norwalk, Conn., SideStep from SideStep, Inc. in Santa Clara, Calif., and FareChase from Yahoo, Inc. in Sunnyvale, Calif., which allow users to search for flight times and hotels. After search results from a search engine are received, the search results are displayed on the user's screen, as in a normal web browser application. In addition, these search results are also displayed on the screens of any other users who are participating in the joint session with the first user, providing simultaneous viewing of the same results. Any of the users in the joint session can select one or more of the search results. These selections are communicated to all the users in the joint session so that every user is aware of the other users' selections.

Additionally, any of the users may take further action on the search results in a manner consistent with using these results in a normal web browser. For example, if the search results are flights received from a query to Yahoo!'s Fare-Chase, a user may select a flight from the search results to proceed with booking the selected flight.

Furthermore, a joint session may be commenced through the initiation and invitation of a first user. For example, several users may be "signed in" on a multi-user communications application such as IM, and one user may invite, via an IM interface, one or more users to participate in a joint session. Upon the acceptance of the invitees, the joint session may be commenced and a query interface may be enabled. Invitees who have declined the invitation may not participate in the joint session.

In addition, an approach allows for users in a joint session to view the list of search results according to their own viewing preferences. For example, each user may apply a different "filter" to selectively view only results that satisfy certain criteria. The viewing preferences and the resulting altered display of search results of one user have no affect on the other users' displays. This additional approach provides each user control and flexibility over how the results are visually displayed to him, even though each user has access to the entirety of the search results.

Once users have selected certain search results, their selections may be viewed by other users in the joint session in a variety of ways. For example, a user may choose to view the full list of search results where results that have been selected by other users are marked. Additionally, a user may choose to view only search results that have been selected by at least one user. Finally, a user may choose to view only search results that have been selected by all the users in the joint session. These viewing options may also be selected on a per-user basis so that each user may choose to view the selected results in a different way.

Finally, the approaches described herein may be used in conjunction with a "chat window", such as the chat window in IM. For example, while search results are obtained and displayed in IM, a chat window may be displayed at the same time so that users may communicate via text contemporaneously with their selection of the search results. In addition, users may click on a search result so that a description of the particular search result will appear as text in the chat window, facilitating a discussion of the referenced search result among the users.

Process for Joint Querying, Viewing, and Using Web-Basted Search Results

FIG. 1 is a flowchart illustrating steps of a process 100 of an embodiment of the current invention where two users, User A and User B, jointly query, view and use web-based search results. The steps of FIG. 1 are further illustrated by screenshots of an example application implementing process 100 in FIGS. 2A-7B.

In process 100, two users are logged in to an application program where they are able to send messages to each other via the Internet or any network such as an intranet, home network, etc. An example of this type of application is Yahoo!'s Instant Messenger ("IM"). Significantly, any application that allows identifiable users to log in and communicate with other identifiable and logged-in users can be used. In the IM application, for example, users create "buddy lists" of other users who are friends. A "buddy list" lets a user quickly see which of his friends are currently logged-in and available to receive messages. In another example, an application that allows users to communicate on a peer-to-peer basis can also be used in process 100.

In step 102, a first user, User A, sends a message to a second user, User B, requesting that User B participate in a joint session with User A. If User B refuses this request, step 104 is performed and the process is terminated. If User B accepts the request, step 106 is performed. In step 106, both users are informed that User B has agreed to participate in the joint session. This information can be communicated to the users via a text message on the users' the screens.

Figure 2A:
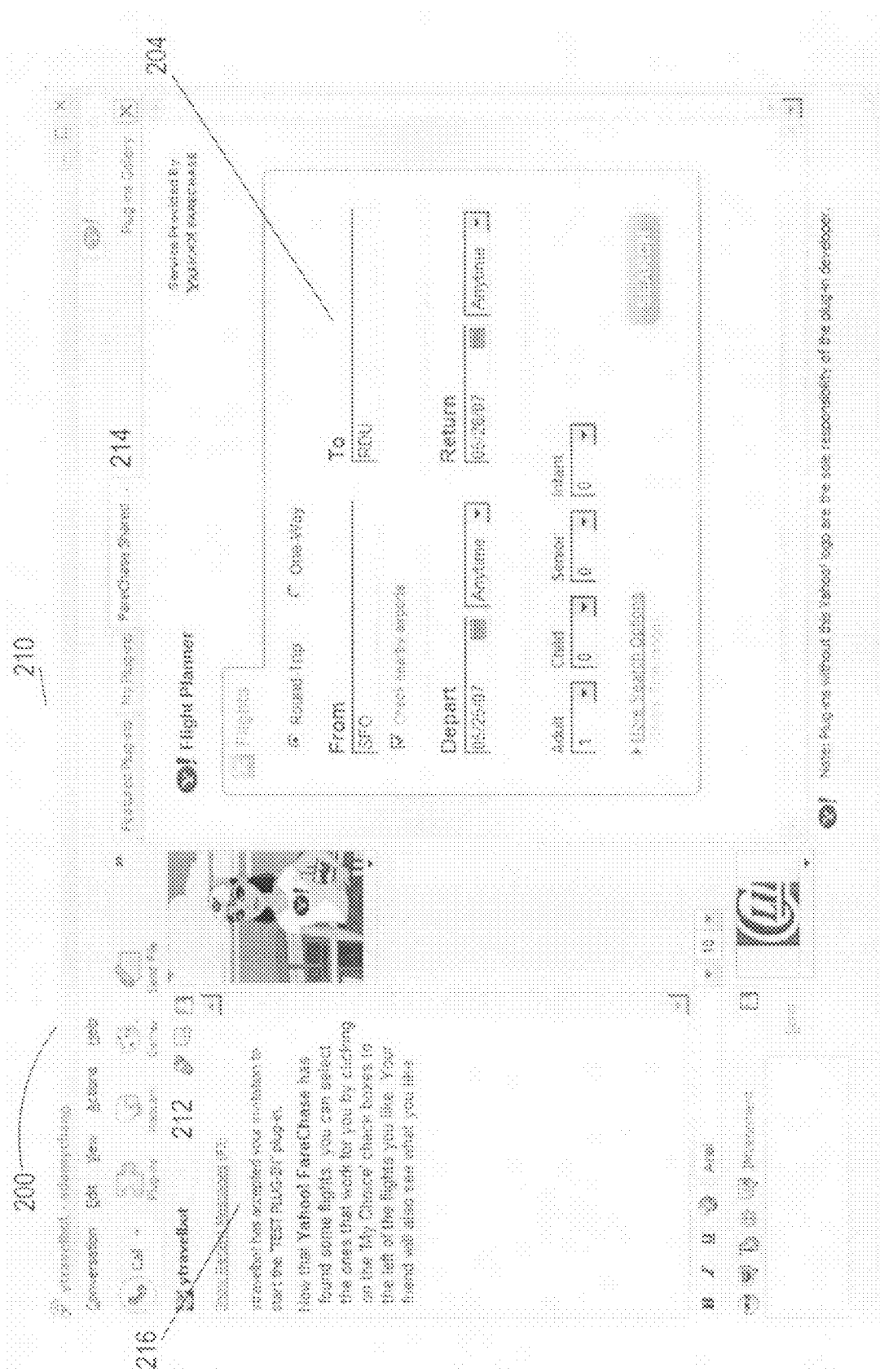
FIGS. 2A and 2B are graphical depictions of two screens seen by two different users in a joint session, where a query for web-based search results is being entered.
Figure 2B:
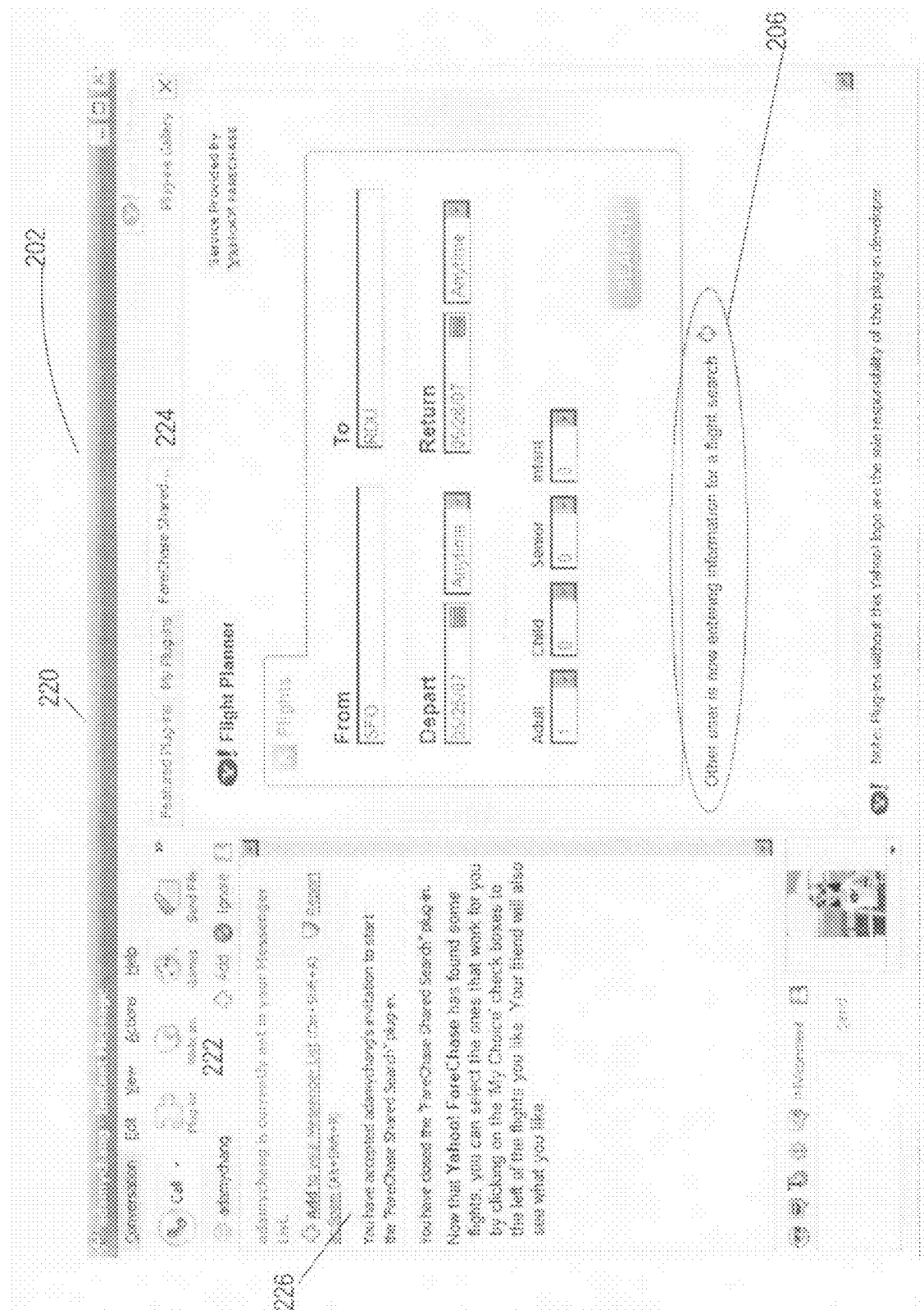

For example, in FIGS. 2A and 2B, screen 200 is a user interface viewable by User A, and screen 202 is viewable by User B. In display 200, application 210 contains two windows—a chat window 212 and a joint session window 214. Similarly, in screen 202, application 220 contains a chat window 222 and a joint session window 224. In this example, the joint session is called "FareChase Shared Search", which utilizes a web-based search engine for commercial airline flights. When step 106 is performed, message 216 is displayed in chat window 212, and User A is informed that User B has accepted his invitation to participate in the joint session. Similarly, message 226 is displayed in chat window 224, and User B is informed that he has successfully accepted User A's invitation to participate in a joint session.

In step 108, one of the users enters a query to the web-based search engine associated with the joint session. The query interface is designed to suit the particular type of search being conducted. In the example in FIGS. 2A and 2B, the joint session is associated with a web-based search engine for commercial flights, so the query interface allows a user to input information regarding departure and destination airports, dates of travel, times of travel, and number of passengers. In other embodiments, the joint session may be associated with search engines for other types of data, such as hotel reservations, movie tickets, apartment rentals, books, and music. In these other embodiments, the query interface may be altered to suit the particular type of data being searched. For example, a query interface for a search engine for movie tickets may have fields that allow users to input title of movie, actors, and directors.

User A enters the query in query interface 204. As User A enters this query, a message is communicated to User B, informing him that User A is currently entering the query. Message 206 contains this information and is displayed in User B's chat window 222. Although User A enters the query, User B may also enter queries. In another embodiment, the ability to enter queries may be restricted to one user, which may be the initiating user or another designated user.

After step 108, step 110 is performed. In this step, the user-entered query is sent to the web-based search engine associated with the joint session. In one embodiment, the query interface is a web browser linked to the web page of a search website, reconfigured to fit the display of the application running the joint session. Once a query is entered, the query is sent to the search website in the same manner as a query would be sent via a traditional web browser. In FIGS. 2 FIGS. 2A and 2B, for example, the query request is sent to the Yahoo! FareChase website for searching. In other embodiments, other protocols may be employed to send queries over the Internet to a search engine associated with the joint session.

Figure 3A:
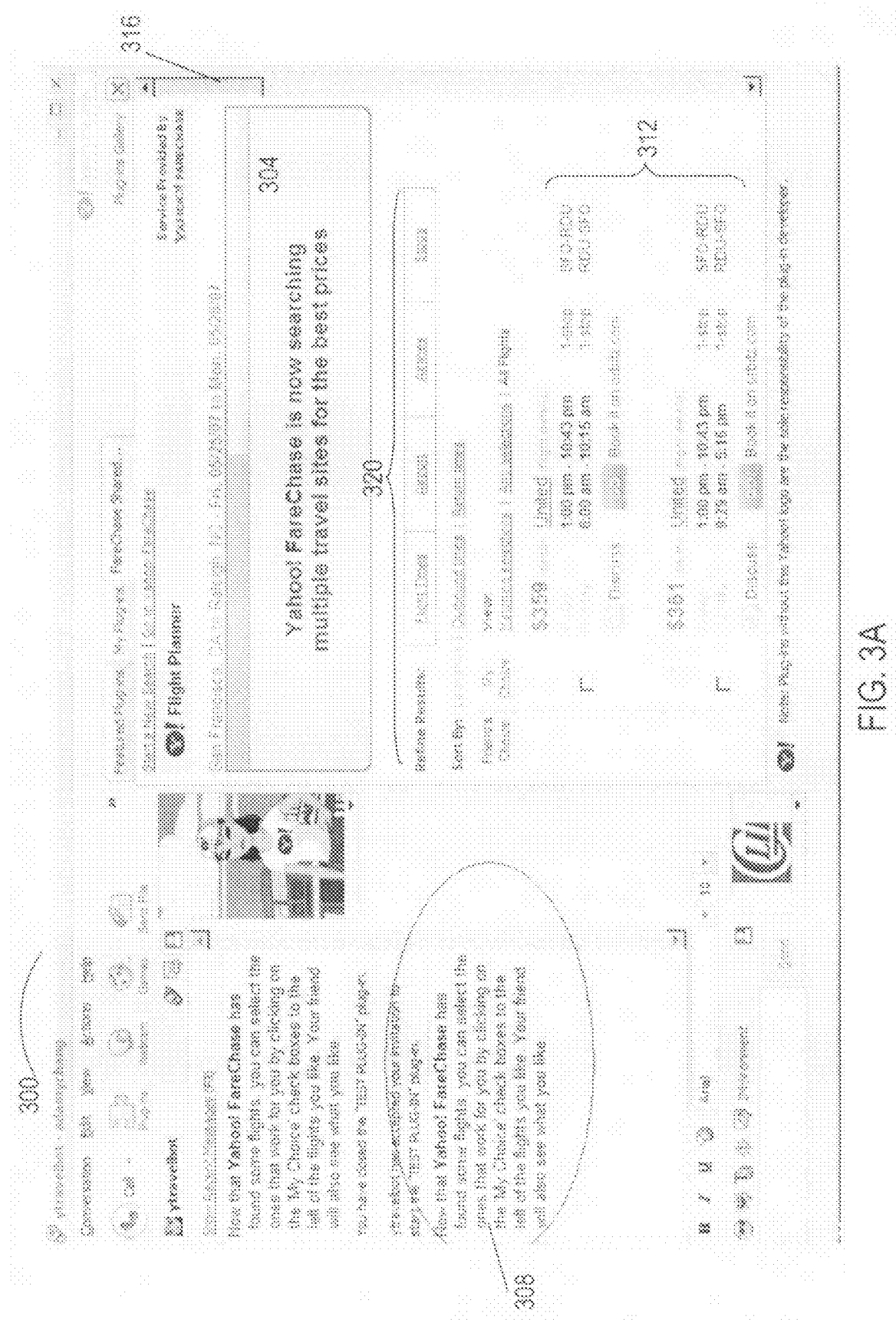
FIGS. 3A and 3B are graphical depictions of two screens seen by two different users in a joint session, where search results from a query are displayed.
Figure 3B:
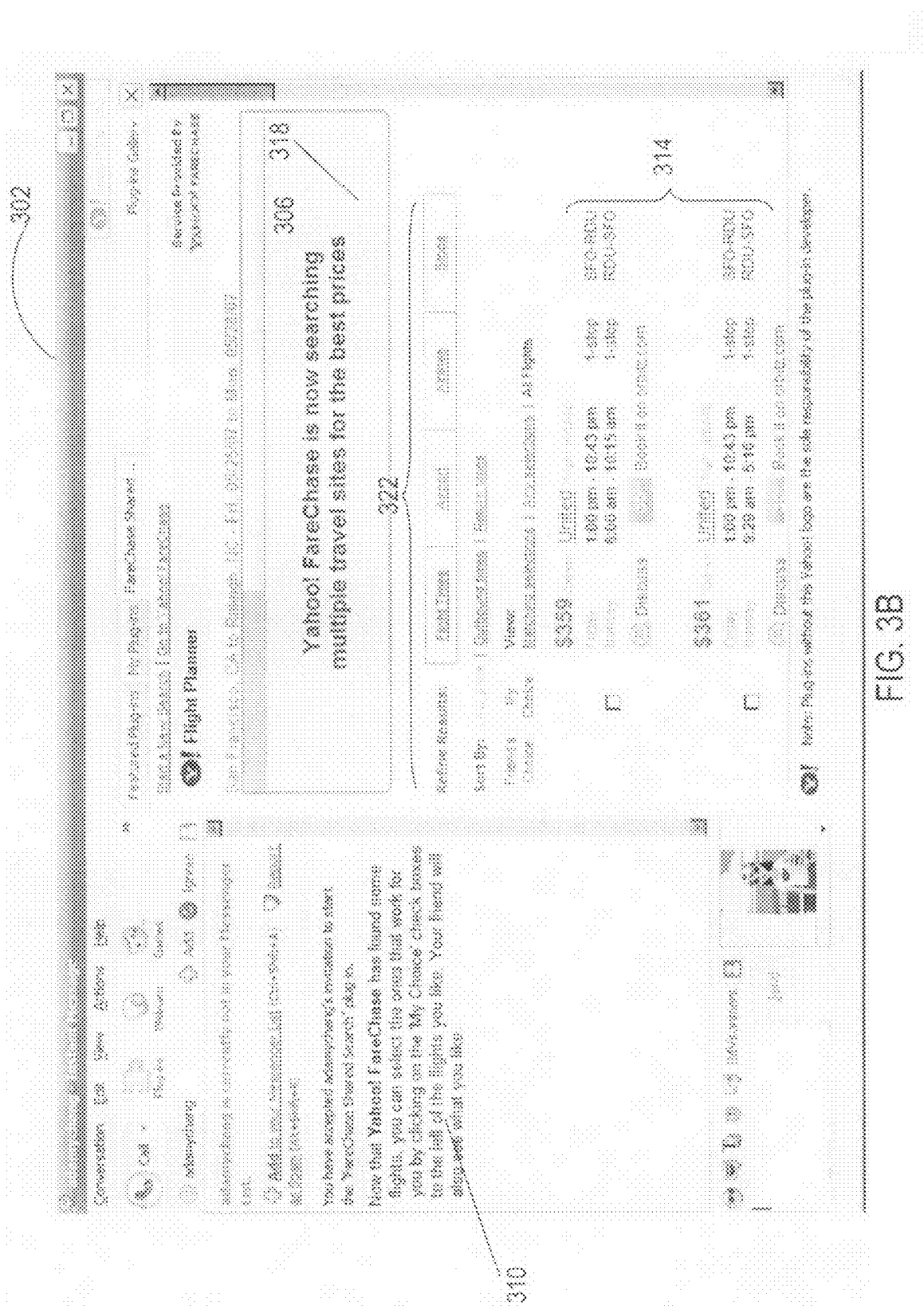

In step 112, the user-entered query is being processed by the web-based search engine and search results are received at the end of the query processing. In FIGS. 3A and 3B, screens 300 and 302 illustrate the windows viewable by User A and User B, respectively. Messages 304 and 306 inform the users that the query is currently being processed by the web-based search engine. Once results are found and received, messages 308 and 310 further inform the users that the results have been received and the displayed results are ready for further processing by the users.

Next, in step 114, the search results are displayed for viewing by both users. In FIG. 3A, for example, search results 312, a complete list of the search results, are displayed for viewing by User A. Similarly, search results 314 in FIG. 3B are displayed for viewing by User B. If the list of results is too long to be included in a user's display window, one approach uses scroll bars, such as scroll bars 316 and 318 in FIGS. 3A and 3B, to allow users to scroll down a list of results in order to view all search results.

Once the search results are received and displayed, users may manipulate the search results in several ways. First, a user may filter the search results. That is, a user may apply a set of criteria to the search results so that only results that satisfy the set of criteria are displayed. This is useful if the user knows that he is only interested in a subset of the results, such as flights that depart after a certain time of the day. Second, a user may select one or more of the results. This is useful because these selections may be communicated to the other users to inform them of the user's opinions of the search results. Finally, after user selections are made, the displayed search results may be further modified to display only search results that are selected. Finally, the displayed search results may be modified to display search results that both fulfill a set of criteria and have been selected by one or more users.

Steps 114 through 120 illustrate the process just described. In step 114, the entirety of search results are displayed. Next, if a user chooses to filter the display of search results by applying a set of criteria, step 116 is performed. In step 116, the display of search results to the user who applied filtering criteria is updated to include only search results that satisfy the filtering criteria. Significantly, each user in a joint session may apply such filtering criteria independently so that the modification of one user's display due to filtering does not affect the displays viewed by other users. This independence of viewing options allows each user to view the search results according to his preference.

Interface 320 in display 300 and interface 322 in display 302 allow User A and User B, respectively, to apply filtering criteria to the full list of search results. In the example illustrated in FIGS. 3A and 3B, User A and User B may filter search results by applying criteria relating to flight times, airports, airlines, and number of stops.

Figure 4A:
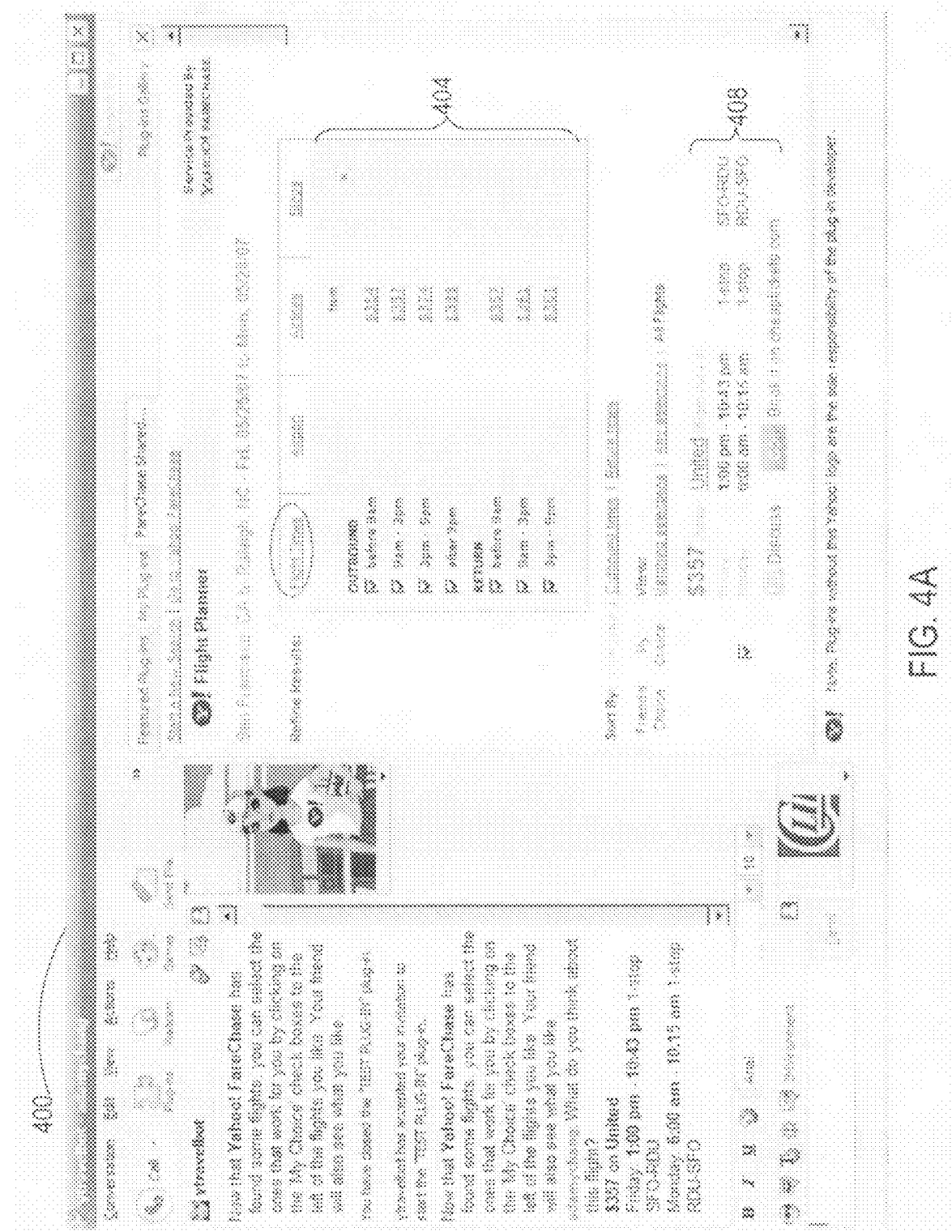
FIGS. 4A and 4B are graphical depictions of two screens seen by two different users in a joint session, where search results from a query are displayed based on user-inputted criteria.
Figure 4B:
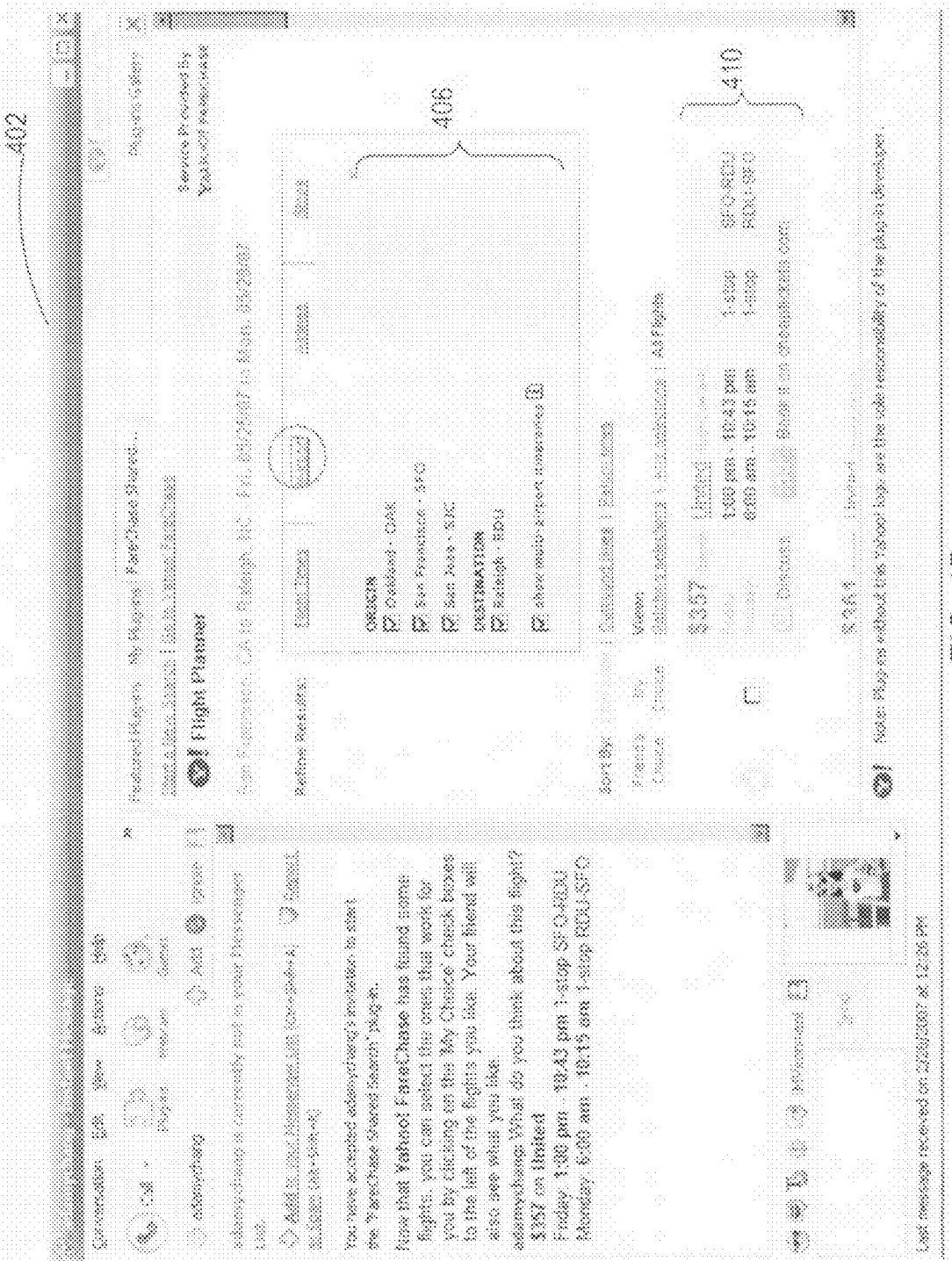

If a user selects one of the filtering criteria in interface 320 or 322, step 116 is performed and that user's displayed search results is updated. FIGS. 4A and 4B illustrates the screens viewed by User A and User B after they have applied different filtering criteria. In FIGS. 4A and 4B, screen 400 is viewable by User A and screen 402 is viewable by User B. In screen 400, interface 404 is displayed after User A has selected flight times as the desired filtering criteria. Filtering interface 404 displays seven options of flight times. User A can now input more specific criteria regarding his preferred flight times, and the list of search results 408 is modified to display only those results which satisfy the specific criteria. Similarly, in display 402, interface 406 is displayed after User B has selected airports as the desired filtering criteria. Filtering interface 406 displays three options for originating airports and one option for destination airport. User B can also input more specific criteria regarding preferred airports, and the list of search results 410 is modified to display only search results that satisfy the specific criteria.

Figure 5A:
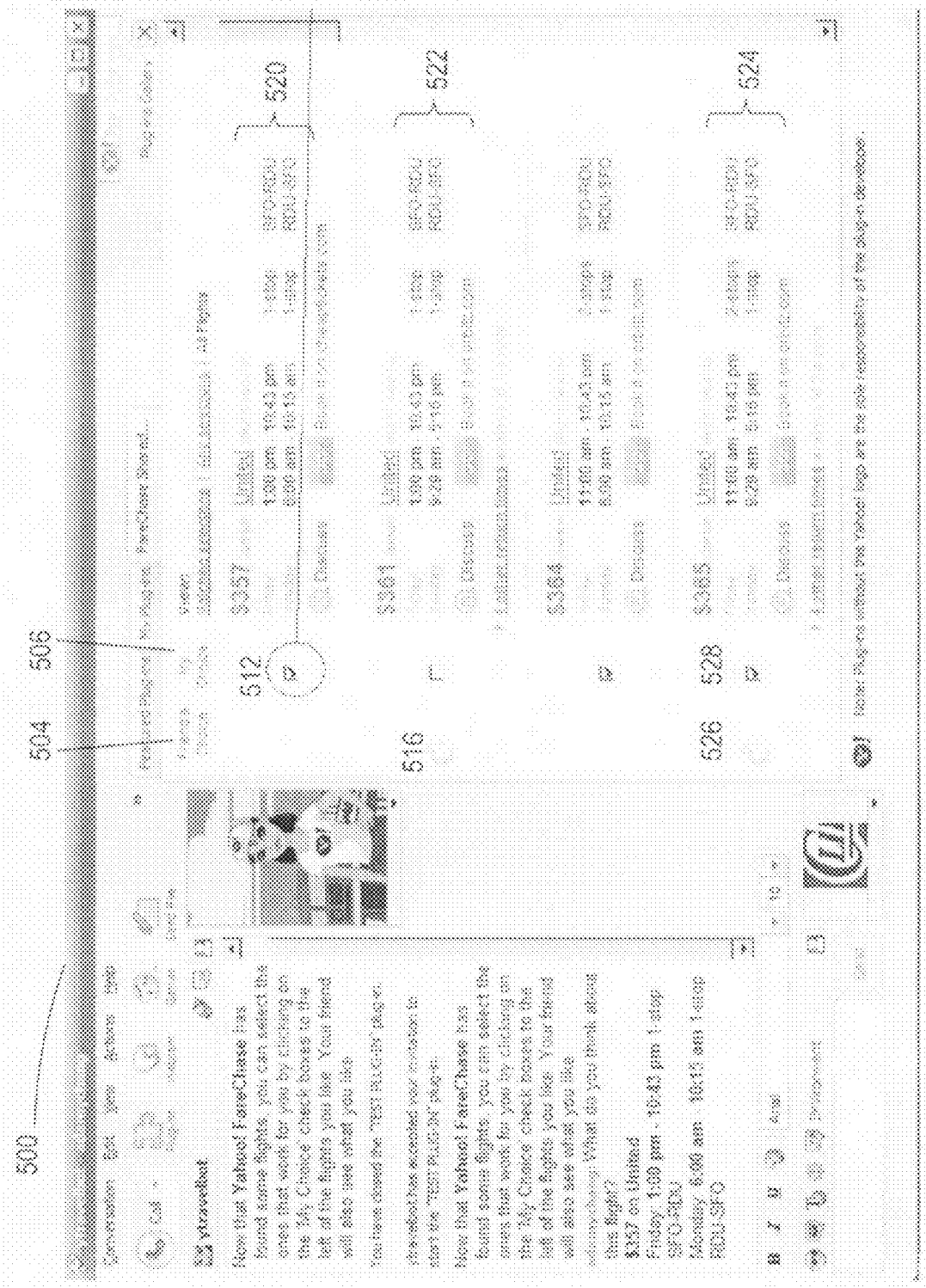
FIGS. 5A and 5B are graphical depictions of two screens seen by two different users in a joint session, where search results from a query are selected by the two users.
Figure 5B:
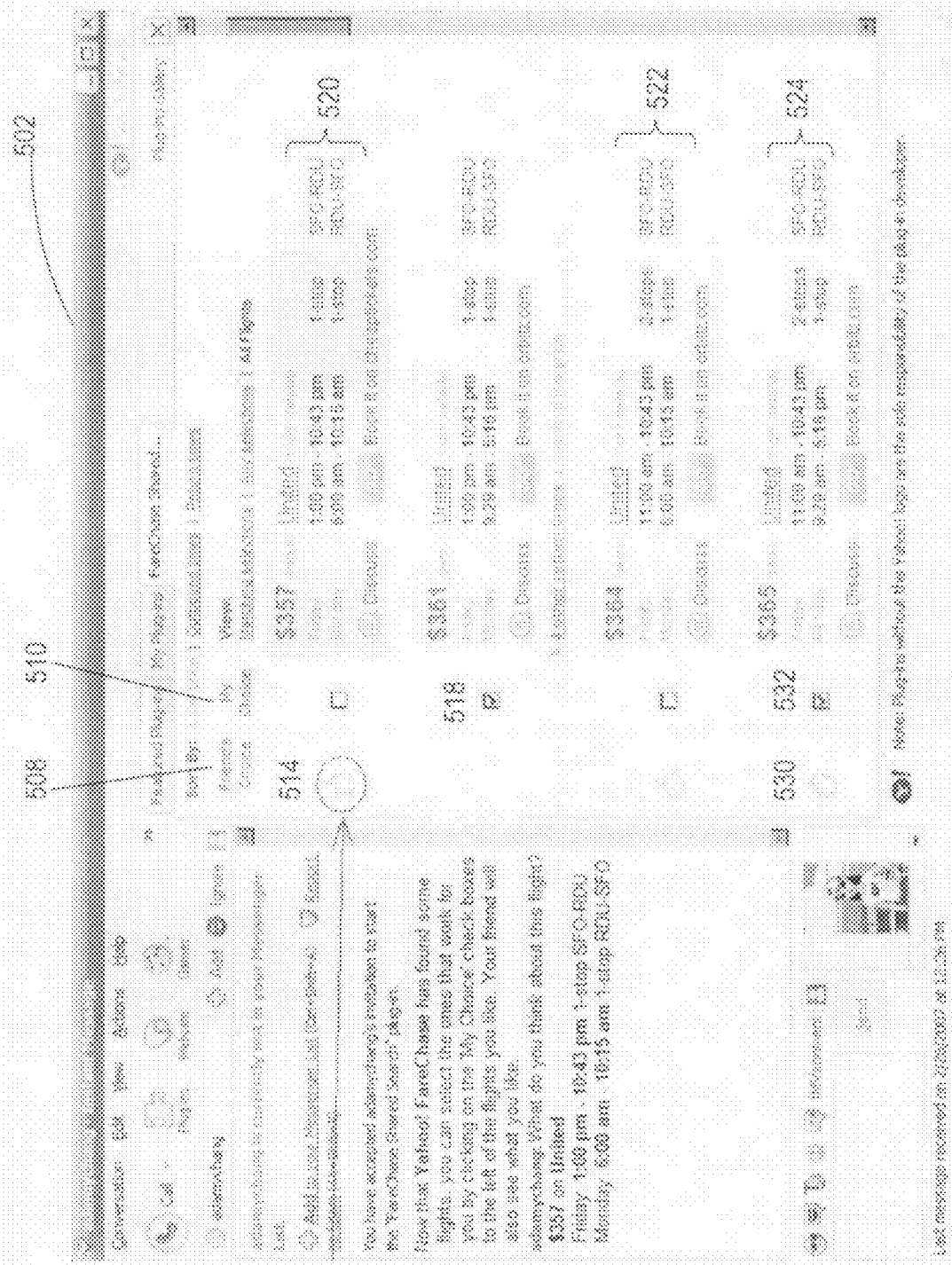

From step 114, if users select one or more of the search results, step 118 will be performed. In step 118, the displayed results list of both User A and User B are updated to reflect the selection(s) that have made by either user. FIGS. 5A and 5B further illustrate this. In FIGS. 5A and 5B, display 500 is a screen viewable by User A and display 502 is a screen viewable by User B. In screen 500, columns 504 and 506 indicate the selections made by User B and User A, respectively. Column 506 is controlled by User A and User A may click on one or more of boxes in that column, causing a check to appear in the box, to select one or more of the corresponding flights. For example, box 512 has a check inside it, indicating that the flight corresponding to box 512, flight 520, has been selected by User A. Similarly, in screen 502, columns 508 and 510 indicate the selections made by User A and User B, respectively. In column 508, a thumbs-up symbol 514 is displayed next to flight 520, indicating that User A has selected 520 as discussed. These columns, along with the markings of checked boxes and thumbs-up symbols next to the search results, instantaneous and visually clear information regarding which of the search results have been selected by a user and other users in the joint session. Note that any other appropriate symbol can be used in place of the thumbs-up symbol.

Two more examples in FIGS. 5A and 5B further illustrate how a display may be updated in step 118. Checked box 518 in column 510 indicates that User B has selected corresponding flight 522. At the same time, display 500, viewable by User A, is updated to reflect this selection. Specifically, thumbs-up symbol 516 in column 504 is displayed, informing User A that User B has selected flight 522. Finally, a result or multiple results may be selected by both users. Flight 524 has been selected by both User A and User B. This is indicated in screen 500, viewable by User A, with the display of thumbs-up 526 and checked box 528. Similarly, thumbs-up 520 and checked box 532 in screen 502 convey the same information to User B.

Figure 6A:
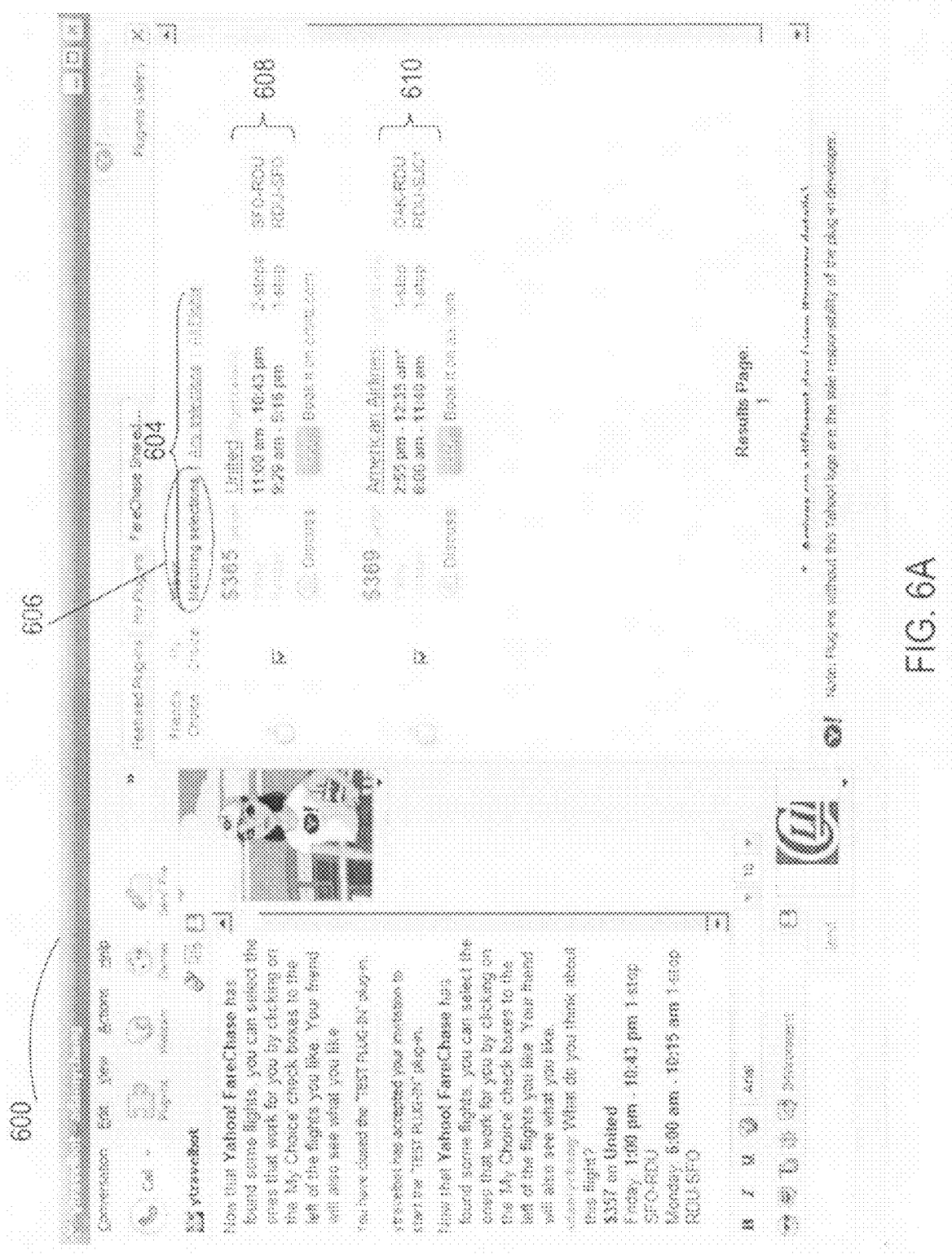
FIGS. 6A and 6B are graphical depictions of two screens seen by two different users in a joint session, where search results from a query selected by the two users are displayed based on user preferences.
Figure 6B:
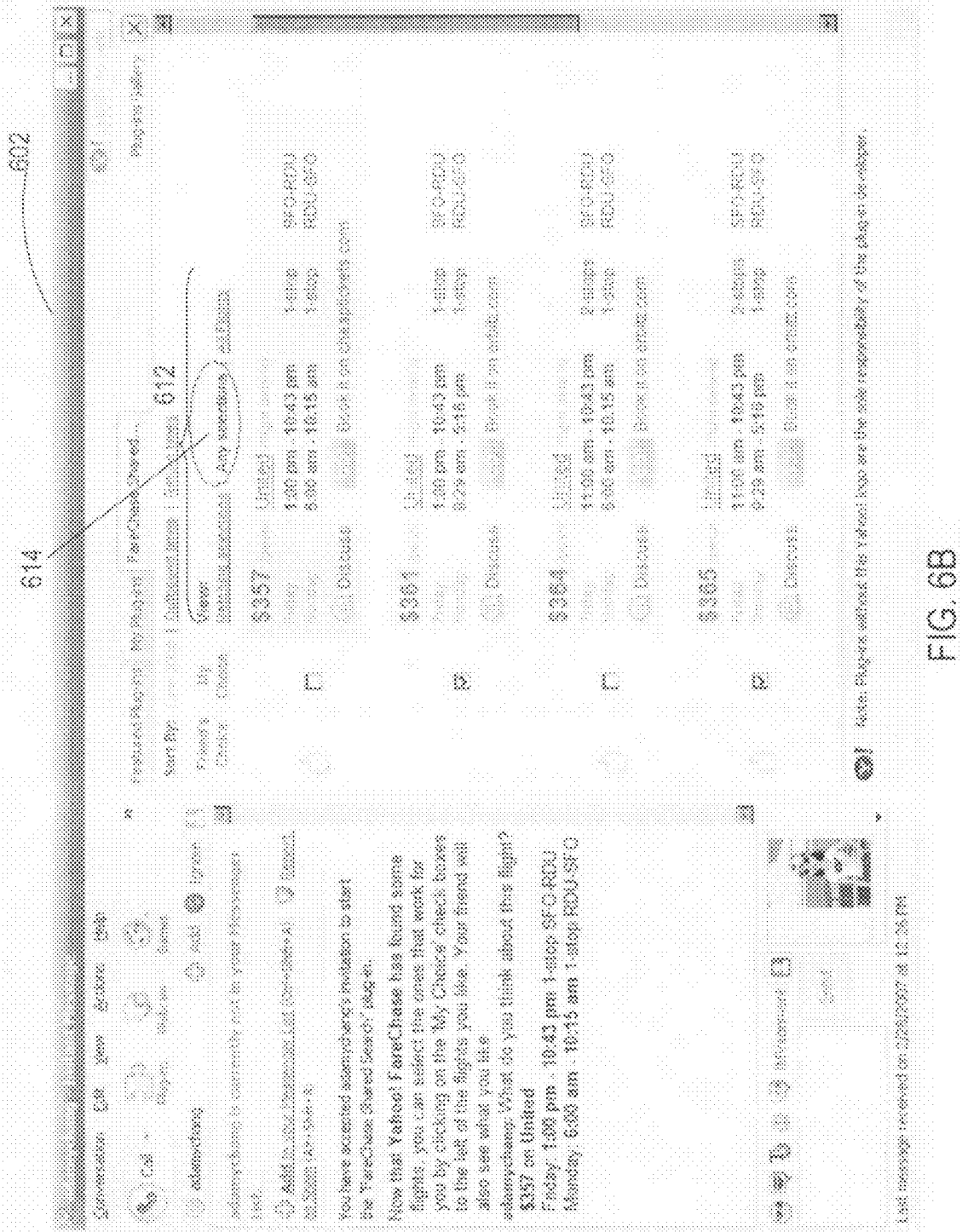

After step 118, users can also specify how results are displayed based on the selected results. If a user chooses to so specify, step 120 is performed. In step 120, screens are updated to reflect the users' choices in displaying selected results. FIGS. 6A and 6B further illustrate how screens are updated in step 120. In FIGS. 6A and 6B, screen 600 is viewable by User A and screen 602 is viewable by User B. In screen 600, an interface 604 allows User A to choose one of three options for viewing the results. In this example, User A has chosen the "matching selections" option 606. As a result, screen 600 shows only the flights which have been selected by both User A and User B, which are flights 608 and 610.

FIG. 6B also illustrates that User B may use user interface 612 in screen 602 to choose viewing options for selected results. In this example, User B has chosen the "any selections" 614 option. As a result, screen 602 shows flights that have been selected by either User A or User B. Flights selected by both User A and User B are also included.

Significantly, both the filtering criteria discussed in step 116 and the viewing options discussed in step 120 may be applied concurrently. For example, a user may wish to only view results that have been selected by both the users and depart before noon. This is possible by applying both filtering criteria and viewing option selection.

As FIG. 1 shows, steps 116, 118, and 120 may be repeatedly performed to update the displays as users apply different filtering criteria, select different results, and choose different viewing options for selected results.

Referencing Results in a Chat Window

As discussed in step 118 above, users may select one or more of the results in a result list and can also view the selection(s) of other users. This allows users to easily communicate their preferred choices to other users. However, this communication may be limited because users cannot convey more detailed information about their selections. In one embodiment, the results list is displayed in one window of an application and a chat window is displayed in another window of the application. For example, in FIGS. 7A and 7B, screen 700 is viewable by User A and screen 702 is viewable by User B. In screen 700, the IM application 710 contains chat window 712 and joint flight search session window 714. Similarly, in screen 702, IM application 720 contains chat window 722 and joint flight search session window 724. The chat windows 712 and 722 allow users to communicate with one another through typed messages. The concurrent display of chat windows and joint flight search session windows allows users to easily view both messages regarding the flights and the flights themselves at the same time.

Figure 7A:
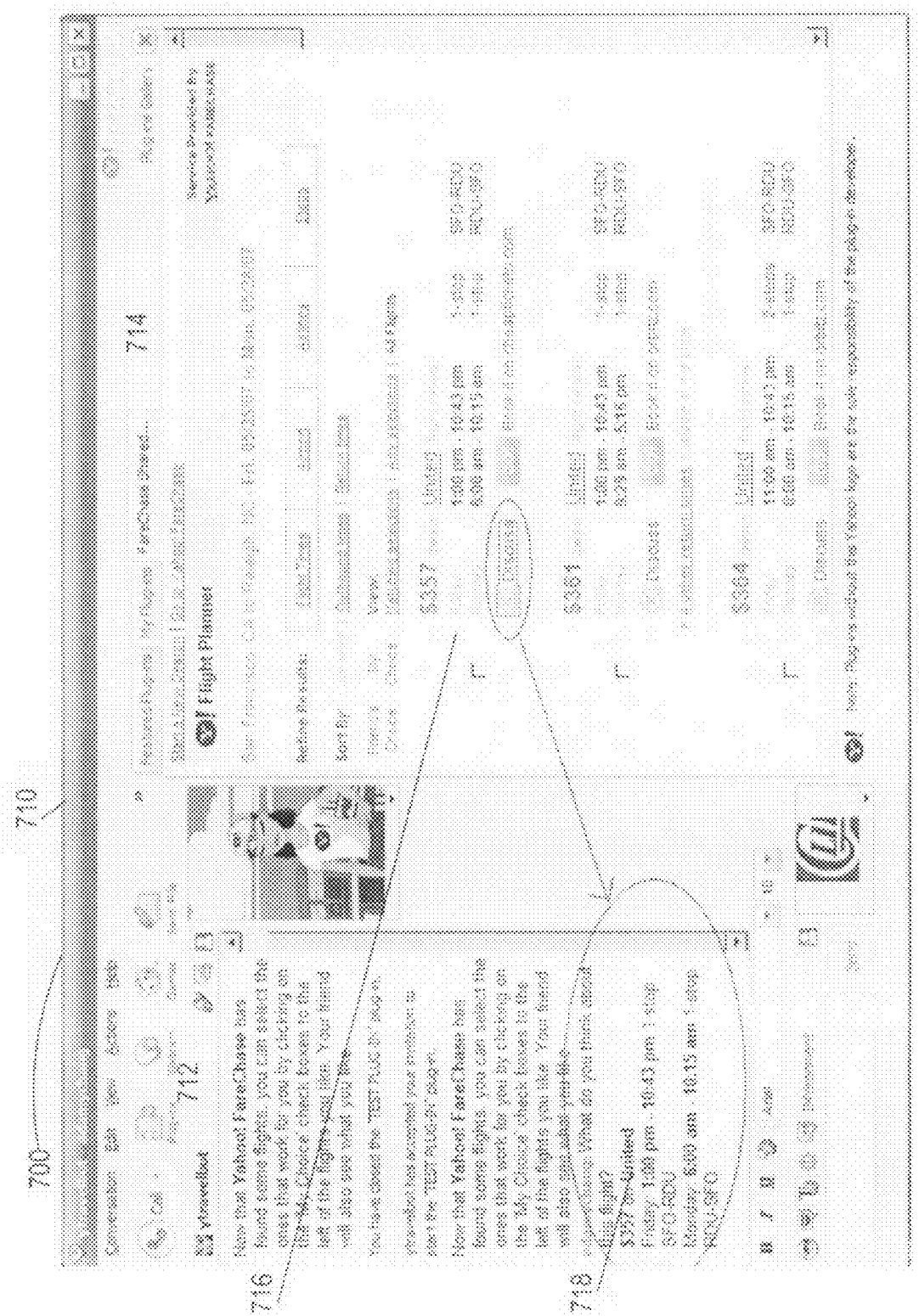
FIGS. 7A and 7B are graphical depictions of two screens seen by two different users in a joint session, where one of the search results from a query is referenced in a chat window.
Figure 7B:
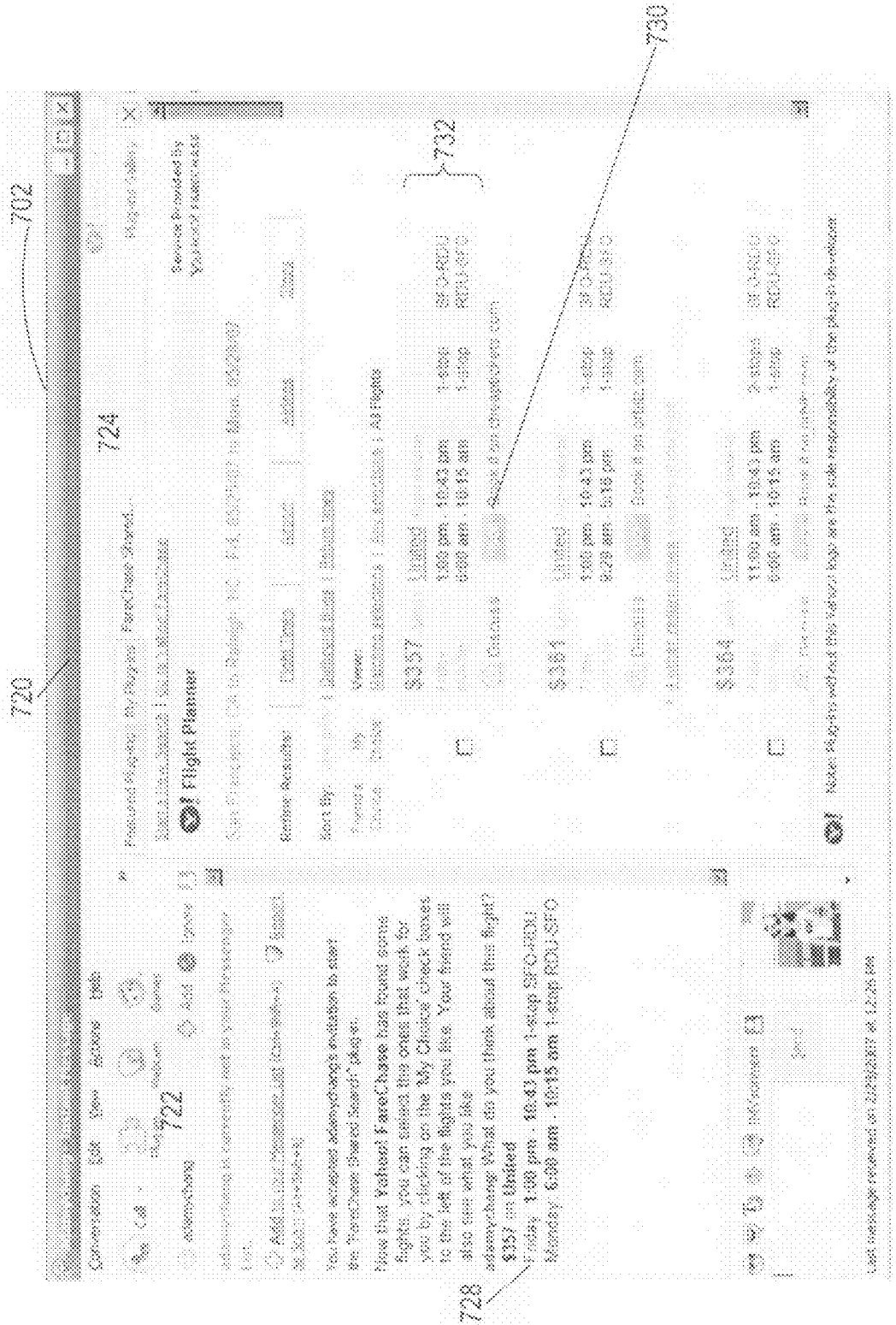

Furthermore, in one embodiment, a user may use an interface in the joint flight search session to enable the corresponding flight result to be displayed in the chat window. In FIG. 7A, for example, User A clicks on "discuss" button 716, resulting in the corresponding flight information to be referenced in chat window 712 as reference 718. This reference also appears as reference 728 in chat 722 in FIG. 7B, as part of the chat window communications. These abilities allow users to quickly and effectively discuss one or more search results.

Using the Web-Based Results

Finally, users are provided with the ability to act upon the search results to complete a transaction. From steps 114, 116, 118, and 120 in FIG. 1, a user may indicate that he would like to commence a transaction based on one of the search results. In the example illustrated in FIG. 7B, User B may indicate this desire by clicking on hyperlink 730. Clicking on hyperlink 730 in this example would enable User B to book flight 732 on cheaptickets.com. In one embodiment, clicking on hyperlink 730 can result in the opening of a web browser application that would go to a web page where User B would be able to complete the booking of the flight. As illustrated in FIG. 7A, these clickable links are displayed for all the flights listed and are displayed in User A's screen 700, so User A may similarly take further action on a particular search result. In another embodiment, the option to commence a transaction based on the search results may be restricted to the initiating user or other designated users only.

Multiple Users

For clarity, the examples discussed herein contain only two users in a joint session. However, more than two users may participate in a joint session in a manner consistent with the two-user examples discussed. In the example where an application program supports three users, the users' screens can display the selections of all three users. In FIGS. 5A and 5B, for example, one more column can be added to screens 500 and 502 to accommodate the third user. Each user can also filter the list of search results for display based on individually-set criteria. Finally, a chat window can be used by all three users to send and receive text-based communications.

Hardware Overview

Figure 8:
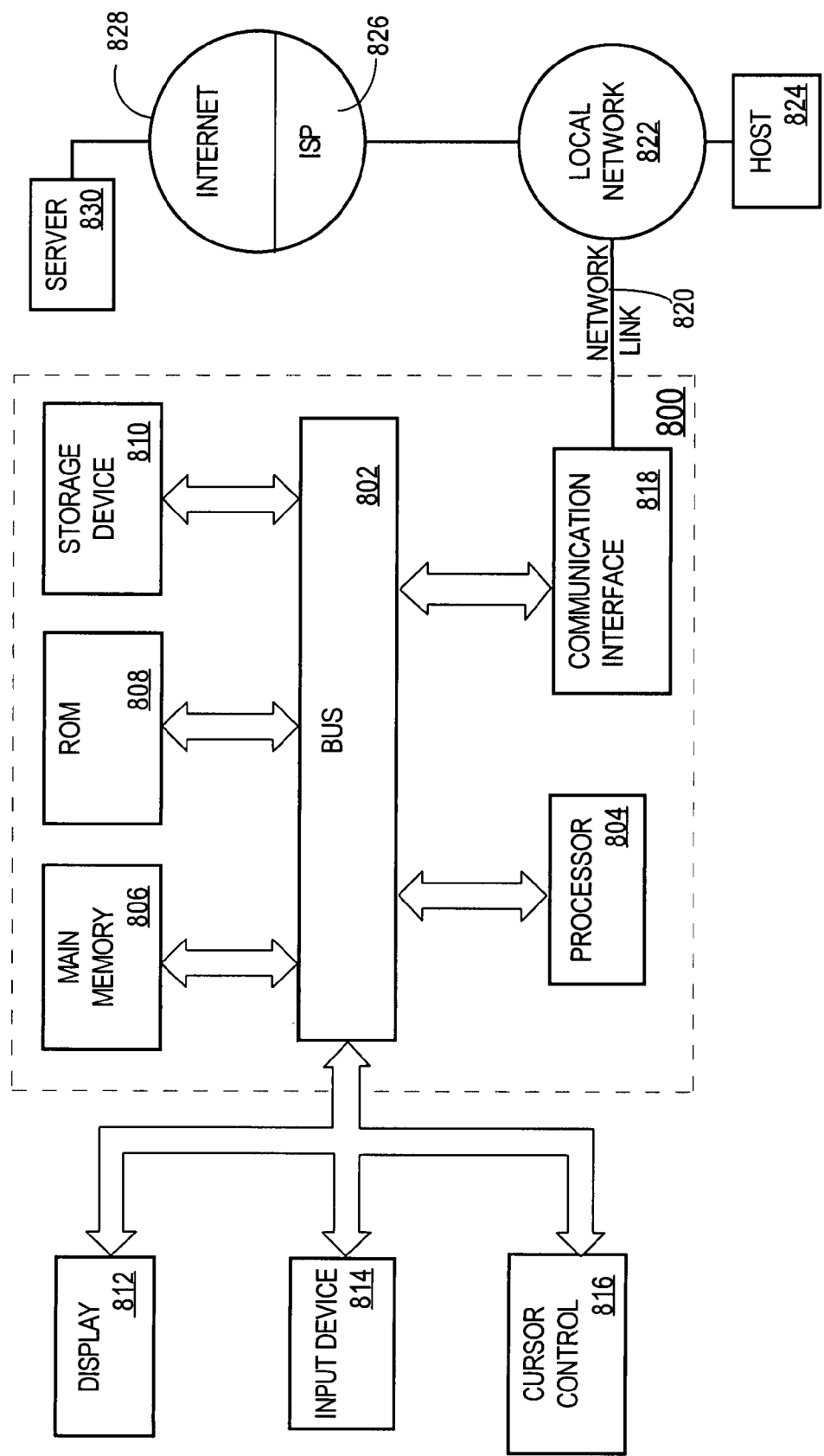
FIG. 8 is a block diagram of a computer system upon which embodiments of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 304 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for joint interaction with web-based search results, comprising:
   displaying, on a first display viewable by a first user, a set of results based on a query;
   displaying, on a second display viewable by a second user, the set of results;
   receiving, from the first user, a first input based on the set of results, the first input selecting a first result from the set of results;
   in response to receiving the first input, automatically updating the first display and the second display to identify which results of the set of results have been selected by the first user while concurrently displaying results that have not been selected by any user;
   receiving, from the second user, a second input based on the set of results, the second input selecting a second result from the set of results;
   in response to receiving the second input, automatically updating the first display and the second display to identify which results of the set of results have been selected by the second user while concurrently displaying the first result and results that have not been selected by any user;
   wherein each display, of the first display and the second display, indicates selection of the first result by the first user in a manner that visually differs from the manner in which said each display indicates selection of the second result by the second user.

2. The method of claim 1, further comprising:
   receiving, from the first user, a filter input indicating criteria for filtering the set of results; and
   filtering the set of results based on the filter input to obtain a filtered set of results; and
   updating the first display and the second display based on the filtered set of results.

3. A non-transitory computer-readable storage medium carrying one or more sequences of instructions which, when executed by one or more processors, causes the one or more processors to perform the method recited in claim 2.

4. The method of claim 1, further comprising:
   receiving, from the second user, a filter input indicating criteria for filtering the set of results;
   filtering the set of results based on the filter input to obtain a filtered set of results; and
   updating the second display based on the filtered set of results without updating the first display based on the filtered set of results.

5. A non-transitory computer-readable storage medium carrying one or more sequences of instructions which, when executed by one or more processors, causes the one or more processors to perform the method recited in claim 4.

6. The method of claim 1, wherein the first display and the second display visually identify, for each selected result, each user that has selected that result.

7. A non-transitory computer-readable storage medium carrying one or more sequences of instructions which, when executed by one or more processors, causes the one or more processors to perform the method recited in claim 6.

8. The method of claim 1, wherein a set of matched results contains all results that have been selected by both the first user and the second user, wherein a set of selected results contains all results that have been selected by at least one of the first user or the second user, and further comprising:
   receiving, from at least one of the first user and the second user, at least one selection-viewing input indicating instructions for displaying the set of results;
   in response to the at least one selection-viewing input being received from the first user, updating the first display to display the set of matched results or the set of selected results, based on the at least one selection-viewing input without displaying results that have not been selected by any user;
   in response to the at least one selection-viewing input being received from the second user, updating the second display to display the set of matched results or the set of selected results, based on the at least one selection-viewing input without displaying results that have not been selected by any user.

9. A non-transitory computer-readable storage medium carrying one or more sequences of instructions which, when executed by one or more processors, causes the one or more processors to perform the method recited in claim 8.

10. The method of claim 1, wherein the first display and the second display visually identifying which results have been selected by both of the first user and the second user.

11. A non-transitory computer-readable storage medium carrying one or more sequences of instructions which, when executed by one or more processors, causes the one or more processors to perform the method recited in claim 10.

12. The method of claim 1, further comprising:
   displaying, on the first display, a first chat window;
   displaying, on the second display, a second chat window;
   receiving, from at least one of the first user and the second user, at least one selection input selecting a result from the set of results;
   for each of the at least one selection input:
      displaying, on the first chat window and the second chat window, text that is based on one of the at least one selection input.

13. A non-transitory computer-readable storage medium carrying one or more sequences of instructions which, when executed by one or more processors, causes the one or more processors to perform the method recited in claim 12.

14. A non-transitory computer-readable storage medium carrying one or more sequences of instructions which, when executed by one or more processors, causes the one or more processors to perform the method recited in claim 1.

15. A method for jointly using web-based results, comprising:
   displaying, on each of a plurality of displays, a set of results;
   wherein a first display in the plurality of displays is viewable by a first user in a plurality of users and a second display in the plurality of displays is viewable by a second user in the plurality of users;
   receiving, from the first user, a first input selecting one or more results from the set of results;
   receiving, from the second user, a second input selecting one or more results from the set of results;
   in response to receiving the first input and the second input, automatically updating, at least the second display to visually identify which results of the set of results have been selected by both the first user and the second user, while concurrently displaying results that have been selected by both the first user and the second user and results that have not been selected by either the first user or the second user.

16. The method of claim 15, further comprising updating, based at least in part on the input received from the first user and the second user, the first display to display the results that have been selected by both the first and the second user without displaying the results that have not been selected by both the first and the second user.

17. A non-transitory computer-readable storage medium carrying one or more sequences of instructions which, when executed by one or more processors, causes the one or more processors to perform the method recited in claim 16.

18. The method of claim 15, further comprising updating, based at least in part on the input received from the first user and the second user, the first display to:
   display the results that have been selected by both the first and the second user;
   display the results that have not been selected by both the first and the second user; identify which of the results have been selected by the first user; and
   identify which of the results have been selected by the second user.

19. A non-transitory computer-readable storage medium carrying one or more sequences of instructions which, when executed by one or more processors, causes the one or more processors to perform the method recited in claim 18.

20. A non-transitory computer-readable storage medium carrying one or more sequences of instructions which, when executed by one or more processors, causes the one or more processors to perform the method recited in claim 15.

* * * * *